(12) United States Patent
Gu et al.

(10) Patent No.: US 10,776,661 B2
(45) Date of Patent: Sep. 15, 2020

(54) METHODS, SYSTEMS AND APPARATUS FOR SEGMENTING AND DIMENSIONING OBJECTS

(71) Applicant: Symbol Technologies, LLC, Lincolnshire, IL (US)

(72) Inventors: Ye Gu, Vernon Hills, IL (US); Yan Zhang, Buffalo Grove, IL (US); Bo Fu, Wheeling, IL (US); Jay J. Williams, Glenview, IL (US); Kevin J. O'Connell, Palatine, IL (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/242,126

(22) Filed: Aug. 19, 2016

(65) Prior Publication Data

US 2018/0053305 A1 Feb. 22, 2018

(51) Int. Cl.
*G06K 9/34* (2006.01)
*G06K 9/62* (2006.01)
(Continued)

(52) U.S. Cl.
CPC ....... *G06K 9/6218* (2013.01); *G06K 9/00771* (2013.01); *G06K 9/4652* (2013.01); *G06K 9/6223* (2013.01); *G06Q 10/083* (2013.01); *G06Q 50/28* (2013.01); *G06T 7/11* (2017.01); *G06T 7/174* (2017.01); *G06T 7/55* (2017.01); *G06T 7/60* (2013.01); *G06T 7/62* (2017.01);
(Continued)

(58) Field of Classification Search
CPC ........... G06T 7/00; G06T 7/0004; G06T 7/73; G06K 9/00791; G06K 9/00664; G06K 9/00825; G06K 9/78; H04N 5/335

USPC .......................................................... 382/173
See application file for complete search history.

(56) References Cited

U.S. PATENT DOCUMENTS 5,408,322 A 4/1995 Hsu et al.
5,988,862 A 11/1999 Kacyra et al.
(Continued)

FOREIGN PATENT DOCUMENTS

CA 2835830 A1 11/2012
CN 104200086 A 12/2014
(Continued)

OTHER PUBLICATIONS

Dubois, M., et al., "A comparison of geometric and energy-based point cloud semantic segmentation methods," European Conference on Mobile Robots (ECMR), vol., No., pp. 88-93, Sep. 25-27, 2013.
(Continued)

*Primary Examiner* — Iman K Kholdebarin
(74) *Attorney, Agent, or Firm* — Yuri Astvatsaturov

(57) ABSTRACT

Methods, systems, and apparatus for segmenting and dimensioning objects are disclosed. An example method disclosed herein includes determining a first sensor of a plurality of sensors toward which a vehicle is moving based on image data generating by the plurality of sensors; designating the first sensor as a reference sensor; combining the image data from the plurality of sensors to generate combined image data representative of the vehicle and an object carried by the vehicle, the combining based on reference sensor; generating a plurality of clusters based on the combined image data; and identifying a first one of the clusters nearest the reference sensor as the object.

20 Claims, 11 Drawing Sheets

(51) Int. Cl.
| | |
|---|---|
| *G06Q 50/28* | (2012.01) |
| *G06T 7/174* | (2017.01) |
| *G06T 7/62* | (2017.01) |
| *G06T 7/11* | (2017.01) |
| *G06K 9/46* | (2006.01) |
| *G06K 9/00* | (2006.01) |
| *G06Q 10/08* | (2012.01) |
| *G06T 7/60* | (2017.01) |
| *G06T 7/00* | (2017.01) |
| *G06T 7/77* | (2017.01) |
| *G06T 7/55* | (2017.01) |
| *G06T 7/90* | (2017.01) |

(52) U.S. Cl.
CPC .................. *G06T 7/77* (2017.01); *G06T 7/90* (2017.01); *G06T 7/97* (2017.01); *G06K 2209/19* (2013.01); *G06T 2207/10024* (2013.01)

(56) References Cited

U.S. PATENT DOCUMENTS

| | | | |
|---|---|---|---|
| 6,115,114 A | 9/2000 | Berg et al. | |
| 6,995,762 B1 | 2/2006 | Pavlidis et al. | |
| 7,137,207 B2 | 11/2006 | Armstrong et al. | |
| 7,248,754 B2 | 7/2007 | Cato | |
| 7,277,187 B2* | 10/2007 | Smith | G01B 11/00 340/928 |
| 7,373,722 B2 | 5/2008 | Cooper et al. | |
| 7,474,389 B2* | 1/2009 | Greenberg | G01B 11/00 356/5.1 |
| 7,487,595 B2 | 2/2009 | Armstrong et al. | |
| 7,527,205 B2 | 5/2009 | Zhu et al. | |
| 7,605,817 B2 | 10/2009 | Zhang et al. | |
| 7,647,752 B2 | 1/2010 | Magnell | |
| 7,726,575 B2 | 6/2010 | Wang et al. | |
| 8,094,937 B2* | 1/2012 | Teoh | G06T 7/11 342/160 |
| 8,132,728 B2 | 3/2012 | Dwinell et al. | |
| 8,134,717 B2 | 3/2012 | Pangrazio et al. | |
| 8,199,977 B2 | 6/2012 | Krishnaswamy et al. | |
| 8,265,895 B2 | 9/2012 | Willins et al. | |
| 8,284,988 B2 | 10/2012 | Sones et al. | |
| 8,463,079 B2 | 6/2013 | Ackley et al. | |
| 8,479,996 B2 | 7/2013 | Barkan et al. | |
| 8,542,252 B2 | 9/2013 | Perez et al. | |
| 8,599,303 B2 | 12/2013 | Stellner | |
| 8,660,338 B2 | 2/2014 | Ma et al. | |
| 8,743,176 B2 | 6/2014 | Stettner et al. | |
| 8,757,479 B2 | 6/2014 | Clark et al. | |
| 8,812,226 B2 | 8/2014 | Zeng | |
| 8,989,342 B2 | 3/2015 | Liesenfelt et al. | |
| 9,007,601 B2 | 4/2015 | Steffey et al. | |
| 9,070,285 B1 | 6/2015 | Ramu | |
| 9,129,277 B2* | 9/2015 | MacIntosh | G06Q 20/208 |
| 9,329,269 B2 | 5/2016 | Zeng | |
| 9,396,554 B2 | 7/2016 | Williams et al. | |
| 9,400,170 B2 | 7/2016 | Steffey | |
| 9,549,125 B1 | 1/2017 | Goyal et al. | |
| 9,562,971 B2* | 2/2017 | Shenkar | G01C 15/002 |
| 9,600,892 B2 | 3/2017 | Patel et al. | |
| 9,778,388 B1 | 10/2017 | Connor | |
| 9,791,862 B1 | 10/2017 | Connor | |
| 2001/0041948 A1 | 11/2001 | Ross et al. | |
| 2002/0164236 A1 | 7/2002 | Fukuhara et al. | |
| 2002/0158453 A1 | 10/2002 | Levine | |
| 2004/0240754 A1 | 2/2004 | Smith et al. | |
| 2005/0016004 A1 | 1/2005 | Armstrong et al. | |
| 2005/0114059 A1 | 5/2005 | Chang et al. | |
| 2006/0106742 A1* | 5/2006 | Bochicchio | G01G 19/083 705/414 |
| 2006/0232684 A1* | 10/2006 | Miki | H04N 9/735 348/223.1 |
| 2007/0074410 A1 | 4/2007 | Armstrong et al. | |
| 2007/0272732 A1 | 11/2007 | Hindmon | |
| 2008/0238919 A1 | 10/2008 | Pack | |
| 2009/0088975 A1 | 4/2009 | Sato et al. | |
| 2009/0103773 A1 | 4/2009 | Wheeler et al. | |
| 2009/0152391 A1 | 6/2009 | McWhirk | |
| 2009/0323121 A1 | 12/2009 | Valkenburg et al. | |
| 2010/0026804 A1 | 2/2010 | Tanizaki et al. | |
| 2010/0091094 A1* | 4/2010 | Sekowski | H04N 5/2252 348/50 |
| 2010/0118116 A1 | 5/2010 | Tomasz | |
| 2010/0131234 A1 | 5/2010 | Stewart et al. | |
| 2010/0208039 A1* | 8/2010 | Stettner | G01B 11/00 348/49 |
| 2010/0295850 A1 | 11/2010 | Katz | |
| 2010/0315412 A1 | 12/2010 | Sinha et al. | |
| 2011/0047636 A1 | 2/2011 | Stachon et al. | |
| 2011/0052043 A1 | 3/2011 | Hyung | |
| 2011/0137527 A1 | 6/2011 | Simon et al. | |
| 2011/0168774 A1 | 7/2011 | Magal | |
| 2011/0172875 A1 | 7/2011 | Gibbs | |
| 2011/0216063 A1 | 9/2011 | Hayes | |
| 2011/0286007 A1 | 11/2011 | Panzgrazio et al. | |
| 2011/0310088 A1 | 12/2011 | Adabala et al. | |
| 2012/0075342 A1 | 3/2012 | Choubassi et al. | |
| 2012/0179621 A1* | 7/2012 | Moir | G06Q 10/0832 705/332 |
| 2012/0185112 A1 | 7/2012 | Sung et al. | |
| 2012/0209553 A1 | 8/2012 | Doytchinov et al. | |
| 2012/0236119 A1 | 9/2012 | Rhee | |
| 2012/0249802 A1 | 10/2012 | Taylor | |
| 2012/0250978 A1 | 10/2012 | Taylor | |
| 2012/0287249 A1* | 11/2012 | Choo | H04N 5/2258 348/47 |
| 2013/0144565 A1 | 6/2013 | Miller | |
| 2013/0156292 A1 | 6/2013 | Chang et al. | |
| 2013/0162806 A1 | 6/2013 | Ding et al. | |
| 2013/0228620 A1 | 9/2013 | Ahem et al. | |
| 2013/0236089 A1 | 9/2013 | Litvak et al. | |
| 2013/0299306 A1 | 11/2013 | Jiang et al. | |
| 2013/0299313 A1 | 11/2013 | Baek, IV et al. | |
| 2013/0321418 A1 | 12/2013 | Kirk | |
| 2013/0329013 A1 | 12/2013 | Metois et al. | |
| 2013/0341400 A1 | 12/2013 | Lancaster-Larocque | |
| 2014/0002597 A1 | 1/2014 | Taguchi | |
| 2014/0028837 A1 | 1/2014 | Gao et al. | |
| 2014/0049616 A1 | 2/2014 | Stellner | |
| 2014/0098094 A1 | 4/2014 | Neumann | |
| 2014/0100813 A1 | 4/2014 | Showering | |
| 2014/0104413 A1 | 4/2014 | McCloskey et al. | |
| 2014/0192050 A1 | 7/2014 | Qiu | |
| 2014/0267614 A1 | 9/2014 | Ding et al. | |
| 2014/0267688 A1* | 9/2014 | Aich | H04N 7/181 348/113 |
| 2014/0300637 A1 | 10/2014 | Fan et al. | |
| 2014/0351073 A1* | 11/2014 | Murphy | G01B 11/02 705/23 |
| 2015/0015602 A1 | 1/2015 | Beaudoin | |
| 2015/0070470 A1* | 3/2015 | McMurrough | G06K 9/6211 348/46 |
| 2015/0088618 A1 | 3/2015 | Basir et al. | |
| 2015/0092066 A1* | 4/2015 | Geiss | H04N 13/239 348/180 |
| 2015/0106403 A1* | 4/2015 | Haverinen | G06F 17/30604 707/792 |
| 2015/0154467 A1 | 6/2015 | Feng | |
| 2015/0161793 A1* | 6/2015 | Takahashi | A61N 5/1077 600/1 |
| 2015/0181198 A1 | 6/2015 | Baele et al. | |
| 2015/0379704 A1 | 12/2015 | Chandrasekar et al. | |
| 2016/0044862 A1 | 2/2016 | Kocer | |
| 2016/0061591 A1 | 3/2016 | Pangrazio et al. | |
| 2016/0070981 A1 | 3/2016 | Sasaki et al. | |
| 2016/0012588 A1 | 4/2016 | Taguchi | |
| 2016/0107690 A1 | 4/2016 | Oyama et al. | |
| 2016/0150217 A1* | 5/2016 | Popov | H04N 13/257 348/48 |
| 2016/0156898 A1 | 6/2016 | Ren et al. | |

(56) References Cited

U.S. PATENT DOCUMENTS

| | | | |
|---|---|---|---|
| 2016/0163067 A1 | 7/2016 | Williams | |
| 2016/0203387 A1* | 7/2016 | Lee | G06T 7/73 348/44 |
| 2017/0004649 A1* | 1/2017 | Collet Romea | G06T 17/00 |
| 2017/0041553 A1 | 2/2017 | Cao et al. | |
| 2017/0150129 A1* | 5/2017 | Pangrazio | G06T 7/593 |
| 2017/0227647 A1* | 8/2017 | Baik | G01S 17/06 |
| 2017/0228885 A1* | 8/2017 | Baumgartner | G06T 17/20 |
| 2019/0141308 A1* | 5/2019 | Swope | H04N 13/296 |

FOREIGN PATENT DOCUMENTS

| | | |
|---|---|---|
| EP | 2439487 A1 | 4/2012 |
| EP | 2562688 A2 | 2/2013 |
| EP | 2693362 A1 | 2/2014 |
| WO | 2003/002935 A1 | 1/2003 |
| WO | 2008/057504 A2 | 5/2008 |
| WO | 2008/154611 A2 | 12/2008 |
| WO | 2013165674 | 11/2013 |
| WO | 2014/092552 A2 | 6/2014 |
| WO | 2015/127503 A1 | 9/2015 |
| WO | 2016/020038 A1 | 2/2016 |

OTHER PUBLICATIONS

Lari, Z., et al., "An adaptive approach for segmentation of 3D laser point cloud." International Archives of the Photogrammetry, Remote Sensing and Spatial Information Sciences, vol. XXXVIII-5/W12, 2011, ISPRS Calgary 2011 Workshop, Aug. 29-31, 2011, Calgary, Canada.

Rusu, et al. "Spatial change detection on unorganized point cloud data," PCL Library, retrieved from Internet on Aug. 19, 2016 [http://pointclouds.org/documentation/tutorials/octree_change.php].

Tahir, Rabbani, et al., "Segmentation of point clouds using smoothness constraint," International Archives of Photogrammetry, Remote Sensing and Spatial Information Sciences 36.5 (Sep. 2006): 248-253.

Golovinskiy, Aleksey, et al. "Min-cut based segmentation of point clouds." Computer Vision Workshops (ICCV Workshops), 2009 IEEE 12th International Conference on. IEEE, 2009.

Douillard, Bertrand, et al. "On the segmentation of 3D LIDAR point clouds."Robotics and Automation (ICRA), 2011 IEEE International Conference on. IEEE, 2011.

Puwein, J., et al., "Robust multi-view camera calibration for wide-baseline camera networks," in IEEE Workshop on Applications of Computer Vision (WACV), Jan. 2011.

Datta, A., et al., "Accurate camera calibration using iterative refinement of control points," in Computer Vision Workshops (ICCV Workshops), 2009.

Olson, Clark F., et al. "Wide-Baseline Stereo Vision for Terrain Mapping" in Machine Vision and Applications, Aug. 2010.

Rusu, et al., "How to incrementally register pairs of clouds," PCL Library, retrieved from the Internet on Aug. 22, 2016 from <http://pointclouds.org/documentation/tutorials/pairwise_incremental_registration.php>.

"Fair Billing with Automatic Dimensioning" pp. 1-4, undated, Copyright Mettler-Toledo International Inc.

"Swift Dimension" Trademark Omniplanar, Copyright 2014.

"Plane Detection in Point Cloud Data" dated Jan. 25, 2010 by Michael Ying Yang and Wolfgang Forstner, Technical Report 1, 2010, University of Bonn.

Brown et al., U.S. Appl. No. 15/078,074, filed Mar. 23, 2016.

Brown et al., U.S. Appl. No. 15/008,710, filed Jan. 28, 2016.

Lecking et al., "Localization in a wide range of industrial environments using relative 3D ceiling features," IEEE, pp. 333-337, Sep. 15, 2008.

Carreira et al., "Enhanced PCA-based localization using depth maps with missing data," IEEE, pp. 1-8 ,Apr. 24, 2013.

Clayton et al., U.S. Appl. No. 15/358,810, filed Nov. 22, 2016.

Swope et al., U.S. Appl. No. 15/015,228, filed Feb. 4, 2016.

Ziang Xie et al., "Multimodal Blending for High-Accuracy Instance Recognition", 2013 IEEE/RSJ International—Conference on Intelligent Robots and Systems, pp. 2214-2221.

N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.

Federico Tombari et al. "Multimodal cue integration through Hypotheses Verification for RGB-D object recognition and 6DOF pose estimation", IEEE International Conference on Robotics and Automation, January 2013.

Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.

Fu et al., U.S. Appl. No. 15/385,113, filed Dec. 20, 2016.

Zheng et al., U.S. Appl. No. 15/131,856, filed Apr. 18, 2016.

F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.

Schnabel et al. "Efficient RANSAC for Point-Cloud Shape Detection", vol. 0, No. 0, pp. 1-12.

Buenaposada et al. "Real-time tracking and estimation of plane pose" Proceedings of the ICPR (Aug. 2002) vol. II, IEEE pp. 697-700.

International Search Report and Written Opinion for International Patent Application No. PCT/US2017/024847 dated Jul. 7, 2017.

International Search Report and Written Opinion for International Patent Application No. PCT/US2017/037863 dated Oct. 18, 2017.

\* cited by examiner

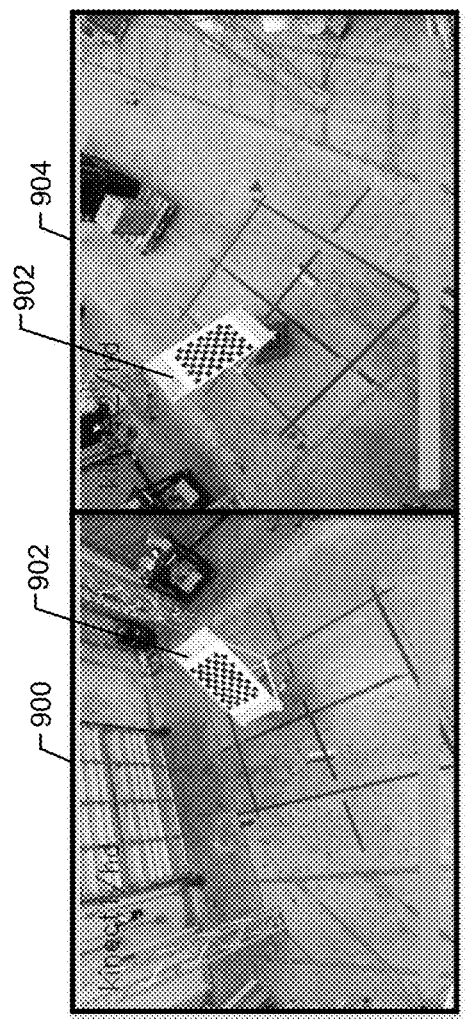
FIG. 9A
FIG. 9B
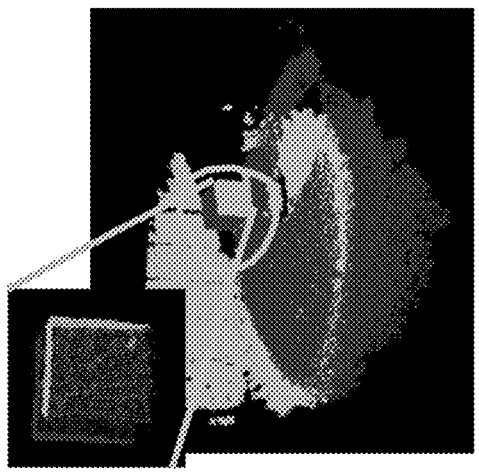
FIG. 9C
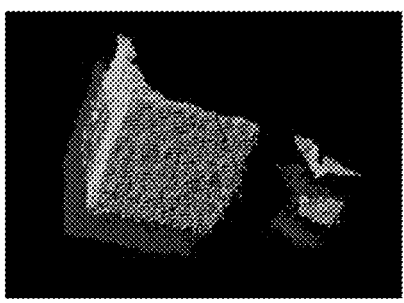
FIG. 9D
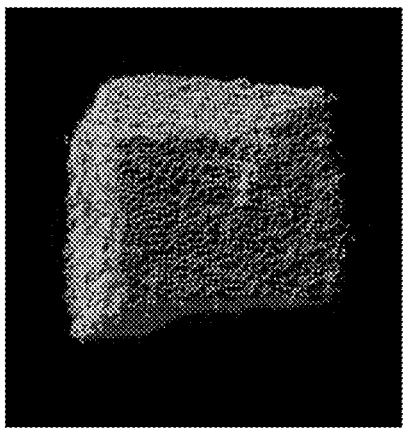
FIG. 9E
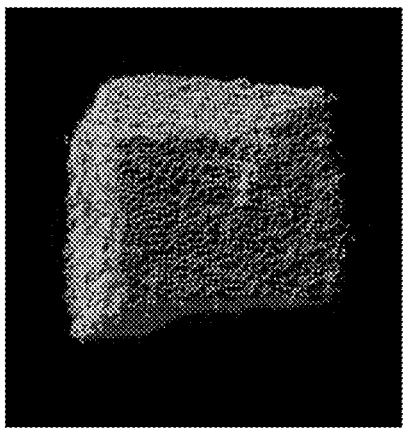
FIG. 9F

METHODS, SYSTEMS AND APPARATUS FOR SEGMENTING AND DIMENSIONING OBJECTS

FIELD OF THE DISCLOSURE

This disclosure relates generally to image processing systems and, more particularly, to methods, systems and apparatus for segmenting and dimensioning objects.

BACKGROUND

Transportation and logistics systems include planning operations that improve efficiency and accuracy of certain delivery services. For example, when a plurality of objects (e.g., packages) are going to be loaded into a container (e.g., delivery trucks), a transportation and logistics system may determine which objects are to be transported via which container and how the objects are to be loaded into the containers. Such systems are better able to execute the planning operations by gaining knowledge of one or more dimensions of the objects to be transported.

BRIEF DESCRIPTION OF THE DRAWINGS

FIGS. 9A-9F illustrate example stages associated with the example image sensor calibrator of FIGS. 1 and/or 8.

DETAILED DESCRIPTION

Figure 1:
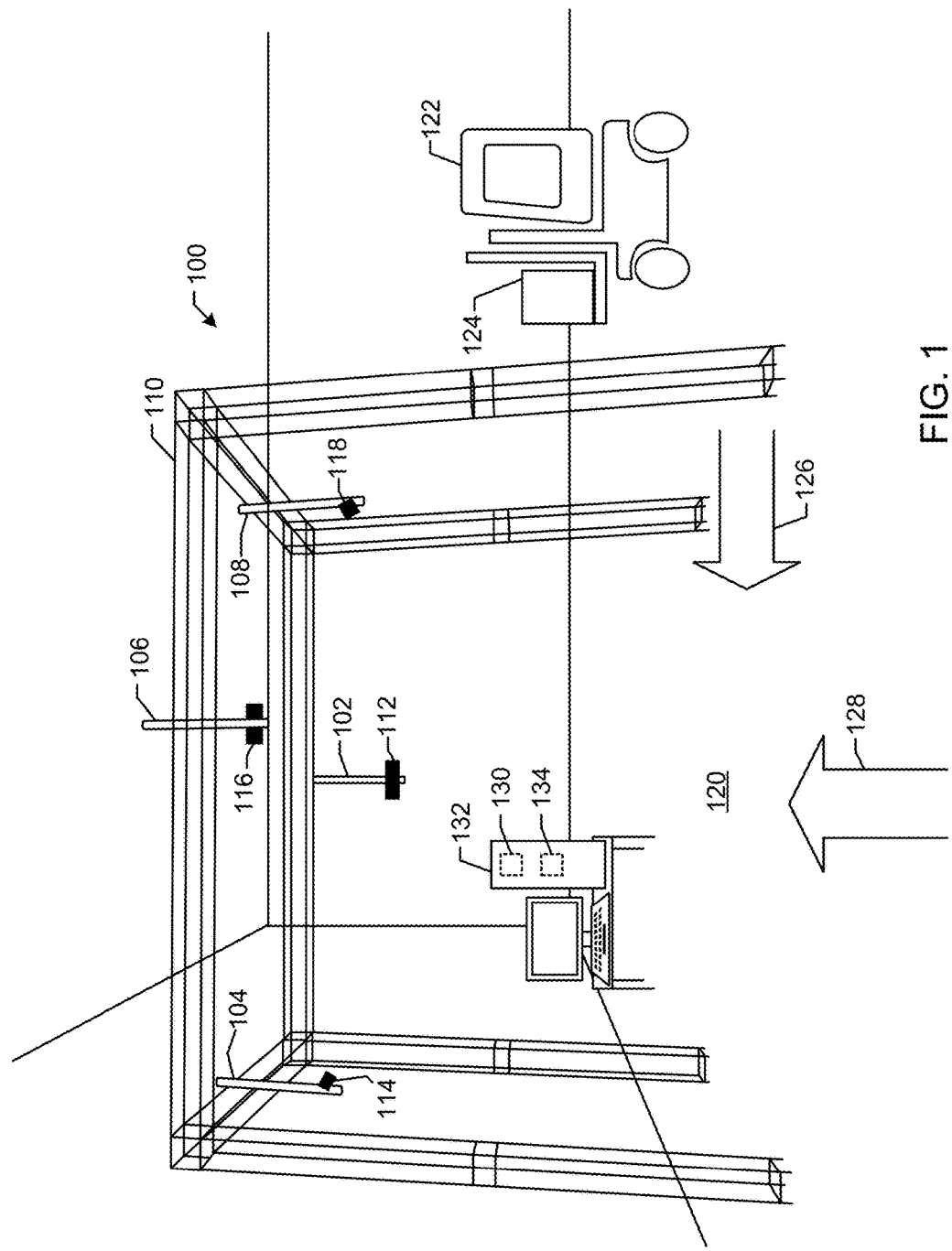
FIG. 1 depicts an example environment including an example object dimensioning system constructed in accordance with teachings of this disclosure.

Advancements in communication technology, such as Internet-based purchasing and ordering, have increased the number of consumers and enterprises that rely on accurate and timely delivery of goods and materials. In turn, demands on those tasked with providing such services have amplified. In addition to greater volumes of packages to be delivered, allotted delivery times have shortened to meet demand as the transportation and logistics industry grows and competition intensifies. Moreover, many entities operate under guarantees in terms of accurate and timely delivery of packages, thereby heightening the importance of accurate and timely performance.

To meet these and other challenges, transportation and logistics entities seek improvements across different aspect of various operations. For example, the process of loading packages into containers (e.g., delivery truck trailers) includes determining which packages should be loaded into which containers, determining a preferred spatial arrangement of the packages in the containers, communicating data to loaders (e.g., persons or machines tasked with physically placing the packages into the containers), and tracking information related to the packages being loaded. Some of these operations involve determining or obtaining one or more characteristics of the packages such as, for example, a weight of a package, a shape of package, and/or one or more dimensions of a package. The process of measuring or obtaining one or more dimensions of an object, such as a package, is sometimes referred to as dimensioning.

However, dimensioning each package to be loaded into a container consumes valuable time. To reduce the time taken to dimension packages, some systems utilizes machines, such as scanners or imagers, to obtain measurements. In known systems that utilize machines to obtain measurements, packages to be imaged or scanned are stationary and isolated from other objects due to challenges and complexities associated with object to be dimensioned being proximate (e.g., abutting or resting on) other objects (e.g., forks of a forklift). Such known systems incur additional time and resource consumption in connection with isolating the packages from other objects before being dimensioned.

Example methods, systems, and apparatus disclosed herein provide efficient and accurate dimensioning of an object while the object is being carried by a vehicle, such as a forklift. In particular, examples disclosed herein include image sensors at multiple capture positions that generate color data and depth data representative of the vehicle and, if present, the object to be dimensioned. As described in detail below, examples disclosed herein identify one of the image sensors toward which the vehicle is moving. That is, examples disclosed herein are capable of determining which of the image sensors is/are closest to pointing directly at a front face of the vehicle. Examples disclosed herein select the image sensor toward which the vehicle is moving as a reference for combining image data generated by the different image sensors to generate combined image data representative of the vehicle and any object(s) being carried by the vehicle.

As described in detail below, examples disclosed herein generate clusters in the image data and use the clusters to identify the object being carried by the vehicle. For example, using the knowledge of which image sensor toward which the vehicle is traveling, examples disclosed herein identify the object being carried by the vehicle by determining which cluster in the combined image data has a centroid nearest the reference image sensor. Examples disclosed herein segment the object by removing other ones of the clusters. Accordingly, examples disclosed herein isolate the image data corresponding to the object despite the object being close to (e.g., resting on or otherwise in contact with) parts of the vehicle.

Examples disclosed herein recognize that the clustering performed on the combined image data may include errors due to, for example, close proximity and/or contact of the object with portions of the vehicle. That is, certain data points in the cluster associated with the object may actually correspond to, for example, forks of a front face of a forklift. To remove such data points from the cluster, examples disclosed herein recognize that a front face of the vehicle is differently colored than the object being carried by the vehicle. As described in detail below, examples disclosed herein maintain a knowledge base including color information for front faces of vehicles. Using the knowledge base of colors that correspond to front faces of the vehicles, examples disclosed herein remove portions of the front face of the vehicle from the combined image data if any such portions remain. That is, examples disclosed herein isolate the object from portions of the vehicle that are in contact with the object, which in the case of a forklift is located proximate the front face of the vehicle. With the object fully segmented from the vehicle, examples disclosed herein accurately and efficiently dimension the object by calculating one or more characteristics of the object (e.g., a shape, a dimension, or a volume).

While the foregoing explains challenges associated with package loading and delivery, similar challenges exist in other environments and applications that involve a need for accurate and efficient dimensions of objects. For example, inventory stocking operations and warehouse management operations suffer when objects are not accurately placed in assigned locations. Further, while example methods, systems and apparatus disclosed herein are described below in connection with package loading operations at a loading dock, example methods, systems and apparatus disclosed herein can be implemented in any other suitable context or environment such as, for example, a warehouse, a retail establishment, an airport, a train loading location, or a shipping port. Moreover, while the following describes a forklift and dimensioning packages being carried by a forklift, example methods, systems, and apparatus disclosed herein are applicable to additional or alternative types of objects and/or additional or alternative types of carriers (e.g., containers, persons carrying object(s), and/or different types of vehicles).

FIG. 1 illustrates an example environment in which example methods, systems and apparatus disclosed herein may be implemented. The example of FIG. 1 is representative of a loading dock including a dimensioning system 100 constructed in accordance with teachings of this disclosure. The example dimensioning system 100 of FIG. 1 is includes a north imaging station 102, a west imaging station 104, a south imaging station 106 and an east imaging station 108. The imaging stations 102-108 of FIG. 1 are mounted to a frame 110. Alternative examples include any suitable number (e.g., three (3) or five (5)) of imaging stations deployed in any suitable manner (e.g., mounted to walls). The terms "north," "west," "south" and "east" are used for ease of reference and not limitation. Each of the imaging stations 102-108 of FIG. 1 includes an image sensor 112-118, respectively, capable of capturing color data and depth data in a respective coordinate system. For example, each of the image sensors 112-118 is an RGB-D sensor (e.g., a Kinect® sensor) that generates an RGB value and a depth value for each pixel in a coordinate system. In alternative examples, each of the imaging stations 102-108 includes a three-dimensional (3D) image sensor that provides depth data and a separate two-dimensional (2D) image sensor that provides color data. In such instances, the 2D image sensor is registered to the coordinate system of the partner 3D image sensor, or vice versa, such that the color data of each pixel is associated with the depth data of that pixel.

Each of the image sensors 112-118 of FIG. 1 are pointed toward an imaging area 120. Each of the image sensors 112-118 is tilted (e.g., at a forty-five (45) degree angle toward a floor of the imaging area 120. As such, each of the image sensors 112-118 generate color data and depth data representative of the imaging area 120. When a vehicle 122 carrying an object 124 enters the imaging area 120, the image sensors 112-118 generate color data and depth data representative of the vehicle 122 and the object 124 from the respective perspectives. In the example of FIG. 1, the vehicle 122 is a forklift and the object 124 is a package to be dimensioned by the dimensioned system 100. For example, the vehicle 122 may be in the process of moving the object 124 from a warehouse location to a trailer or other type of container associated with the loading dock illustrated in FIG. 1. In the illustrated example, vehicles can enter the imaging area 120 in a first direction 126 or a second direction 128. However, any suitable number of directions are possible depending on, for example, surrounding environmental arrangement of the loading dock. As illustrated in FIG. 1, the vehicle 122 is entering the imaging area 120 in the first direction 126, which is towards the west imaging station 114.

To efficiently and accurately dimension the object 124 being carried by the vehicle 122 without interrupting movement of the vehicle 122 and without requiring removal of the object 124 from the vehicle 122, the example dimensioning system of FIG. 1 includes a freight dimensioner 130 constructed in accordance with teachings of this disclosure. In the illustrated example of FIG. 1, the freight dimensioner 130 is implemented on a processing platform 132 deployed at the loading dock. However, the example freight dimensioner 130 disclosed herein may be implemented in any suitable processing platform such as, for example, a processing platform deployed on the vehicle 122 and/or a mobile processing platform carried by a person associated with the vehicle 122 or, more generally, the loading dock. An example implementation of the processing platform 132 described below in connection with the FIG. 11.

Figure 2:
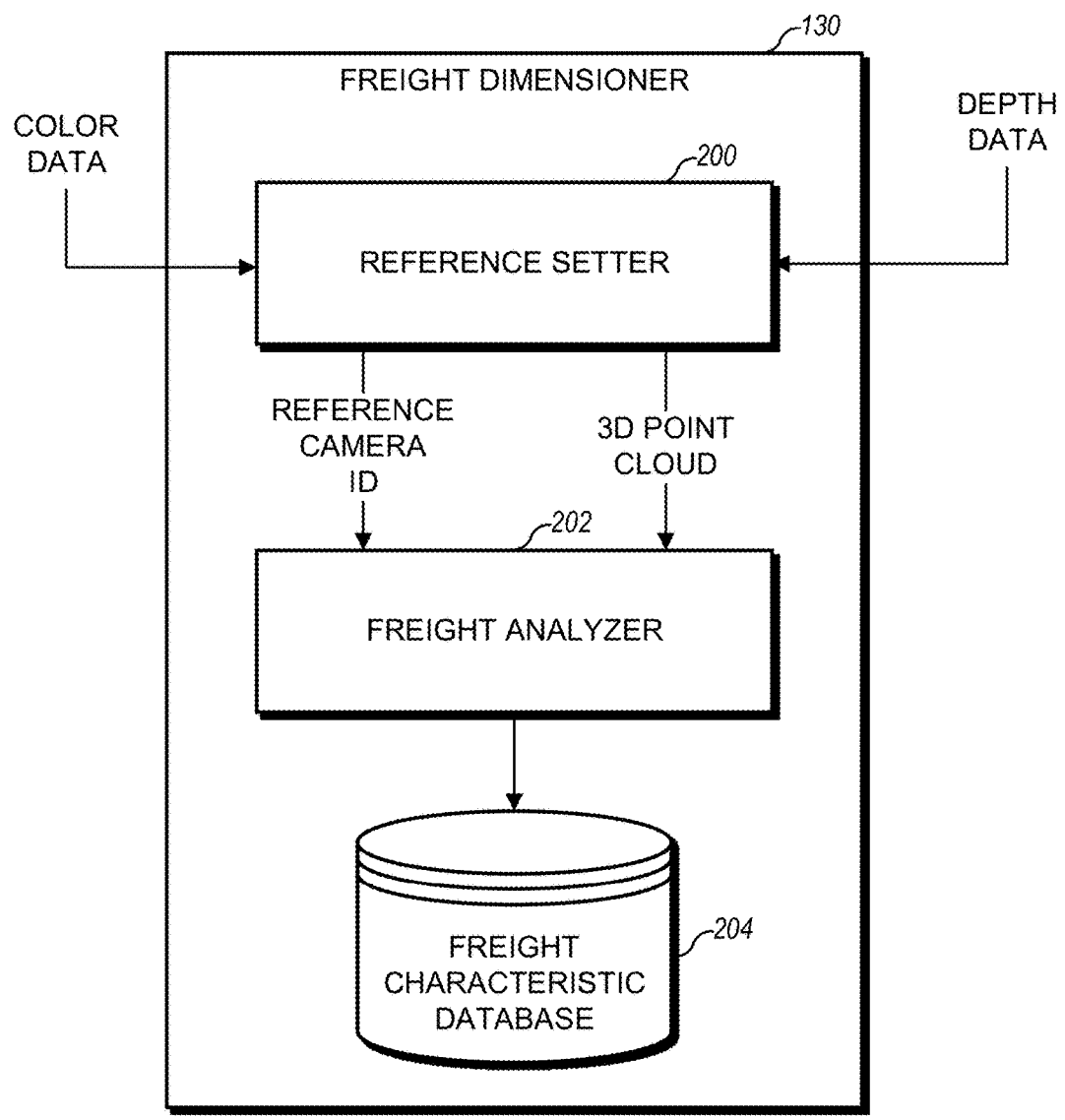
FIG. 2 is block diagram representative of an example implementation of the example freight dimensioner of FIG. 1.

FIG. 2 is a block diagram representative of an example implementation of the freight dimensioner 130 of FIG. 1. The example freight dimensioner 130 of FIG. 1 receives color data and depth data generated by the image sensors 112-118. The example freight dimensioner 130 of FIG. 1 includes a reference setter 200 to determine which of the image sensors 112-118 is the reference sensor at a particular time and to generate, based on which of the image sensors 112-118 is the reference sensor, a point cloud representative of the vehicle 122 and the object 124 from different perspectives. To determine which of the image sensors 112-118 is the reference sensors, the example reference setter 200 uses the received color data and depth data to determine that the vehicle 122 is moving in, for example, the first direction 126. In other words, the example reference setter 200 determines that the vehicle 122 is moving toward, for example, the west image sensor 114. The example reference setter 200 of FIG. 2 selects the image sensor toward which the vehicle 122 is moving as the reference sensor at that particular time. Referring to the example scenario illustrated in FIG. 1, the reference setter 200 selects the west image sensor 114 as the reference sensor. Notably, the example reference setter 200 of FIG. 2 determines the direction of vehicle movement dynamically and selects one of the image sensors 112-118 as the reference sensor dynamically. That is, the example reference setter 200 of FIG. 2 selects one of the image sensors 112-118 as the reference sensor in real-time for a current scenario and, should a different scenario be subsequently encountered, the reference setter 200 selects a different one of the image sensors 112-118 as the reference sensor for that scenario.

To generate the point cloud representative of the vehicle 122 and the object 124 from different perspectives, the example reference setter 200 of FIG. 2 transforms color data and depth data generated by the non-reference sensors to the coordinate system of the reference sensor. In the example scenario illustrated in FIG. 1, the non-reference sensors are the north, south, and east image sensors 112, 116, and 118. As such, when presented with the example of FIG. 1, the example reference setter 200 transforms color data and depth data from the north, south, and east image sensors 112, 116, and 188 to the coordinate system of the west image sensor 114. The result of the transform performed by the example reference setter 200 of FIG. 2 is a 3D point cloud including color information for the points of the cloud.

The example reference setter 200 of FIG. 2A provides the 3D point cloud and a reference camera identifier (ID) indicative of which of the image sensors 114 to a freight analyzer 202. As described in detail below in connection with FIGS. 5 and 6, the example freight analyzer 202 of FIG. 2 clusters points in the 3D point cloud and uses the depth data of the 3D point cloud to determine which one of the clusters is nearest to the reference sensor (e.g., the west image sensor 114 in the example scenario shown in FIG. 1). The example freight analyzer 202 of FIG. 2 identifies the cluster nearest the reference sensor as the object 124. The example freight analyzer 202 uses the identified cluster to segment the object 124 from other elements. For example, the freight analyzer 202 deletes clusters corresponding to the vehicle 122 and clusters corresponding to a person in the vehicle 122. As such, the example freight analyzer 202 of FIG. 2 isolates elements of the point cloud corresponding to the object 124 from other elements of the point cloud.

Additionally, the example freight analyzer 202 of FIG. 2 uses the color data of the 3D point cloud in conjunction with a database of colors known to correspond to a face of the vehicle 122 to identify points in the 3D point cloud corresponding to a front structure of the vehicle 122. Such points may remain after the isolation of the cluster corresponding to the object 124 due to, for example, close proximity of the object 124 to portions of the vehicle 122. In the illustrated example of FIG. 1 in which the vehicle 122 is a forklift, the front structure identified by the freight analyzer 202 is an assembly having forks that carry the object 124 and rails along which the forks traverse. Data points of the point cloud corresponding to such structures may remain and, if not segmented out, may distort dimensioning calculations. Accordingly, the example freight analyzer 202 of FIG. 2 utilizes the difference in color between the object 124 and the front structure of the vehicle 122 to segment the object 124 from the front structure of the vehicle 122 by, for example, removing the points of the 3D point cloud having a color value that corresponds to the known color value of the front structure of the vehicle 122. Notably, the segmentation of the object 124 from the structure carrying the object 124 provided by the freight analyzer 202 enables the object 124 to be isolated from a structure that is in contact with the object 124.

Thus, the example freight analyzer 202 of FIG. 2 provides image data corresponding only to the object 124 such that accurate dimensioning of the object 124 can be performed. The example freight analyzer 202 of FIG. 2 performs any suitable analysis of the object 124 such as, for example, a dimensioning analysis that provides characteristics of the object 124 (e.g., width, length, height, volume, and/or areas of different faces). The example freight dimensioner 130 of FIG. 2 includes a freight characteristic database 204 to store the obtained characteristic information, the associated color data and/or depth data, the reference camera ID, and/or any other data associated with the dimensioning system 100 of FIG. 1.

Figure 3:
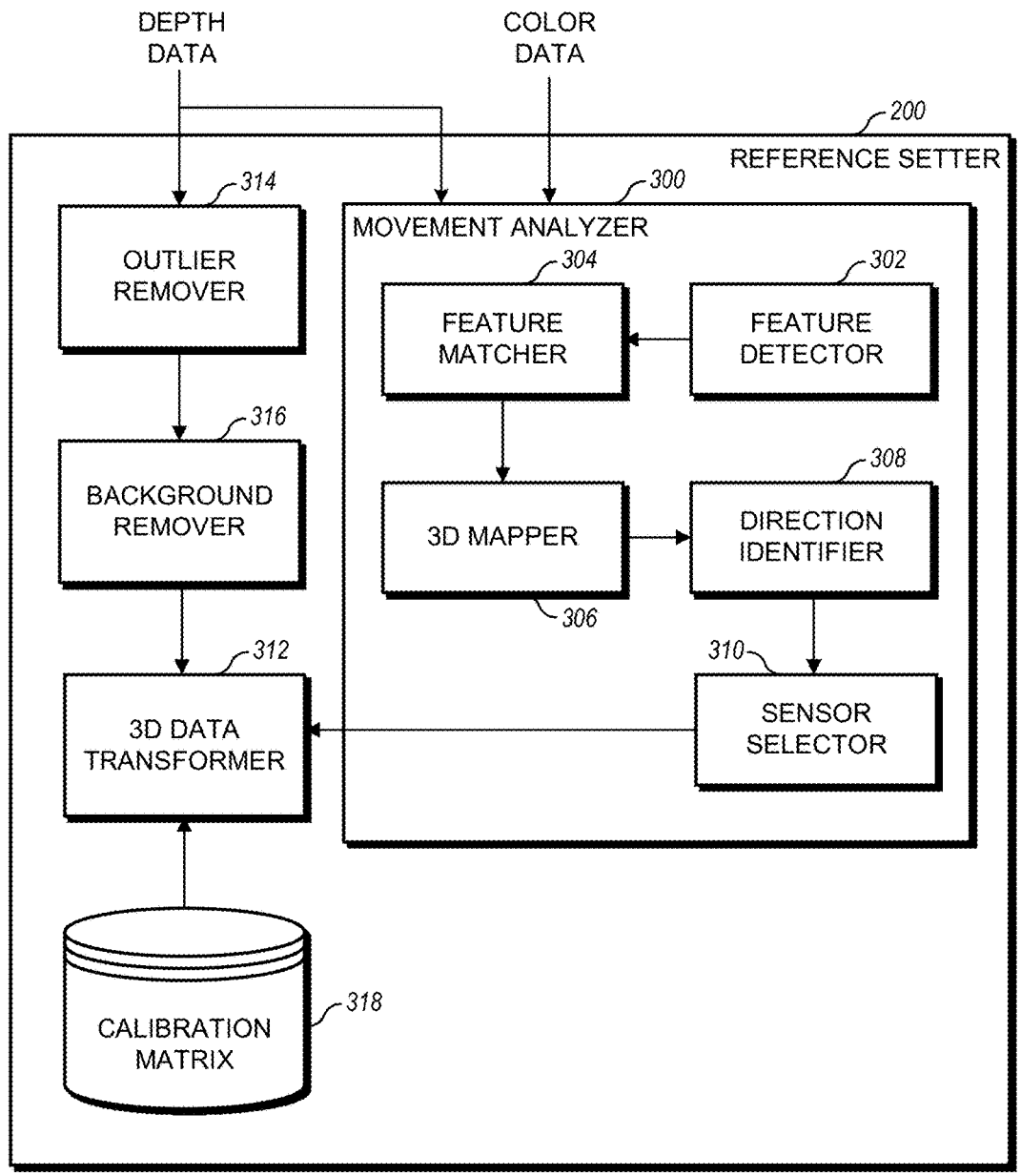
FIG. 3 is a block diagram representative of an example implementation of the example reference setter of FIG. 2.

FIG. 3 is a block diagram representative of an example implementation of the reference setter 200 of FIG. 2. The example reference setter 200 of FIG. 2 includes a movement analyzer 300 having a feature detector 302, a feature matcher 304, a mapper 306, a direction identifier 308 and a sensor selector 310. The example movement analyzer 300 of FIG. 3 receives a series of frames of the color data and depth data. The example feature detector 302 of FIG. 3 uses the color data to identify features in each of the series of frames. For example, the feature detector 302 identifies known identifiable structures, text, or images and/or other aspects of the image data that can be repeatedly and distinguishably identified. The example feature matcher 304 of FIG. 3 identifies the same feature occurring in multiple ones of the frames. That is, the example feature matcher 304 determines whether the same feature is detected by the feature detector 302 across more than one of the series of frames. For example, the feature matcher 304 determines which portions of a first frame associated with a first time correspond to a feature also detected in a second frame associated a second time subsequent to the first time. If the matching features are differently located in the different frames, those features are determined to be in motion. The example 3D mapper 306 of FIG. 3 maps the matching features, which were detected using the color data, to the depth data. Accordingly, the example 3D mapper 306 of FIG. 3 generates 3D data indicative of matching features across a series of frames.

Figure 4:
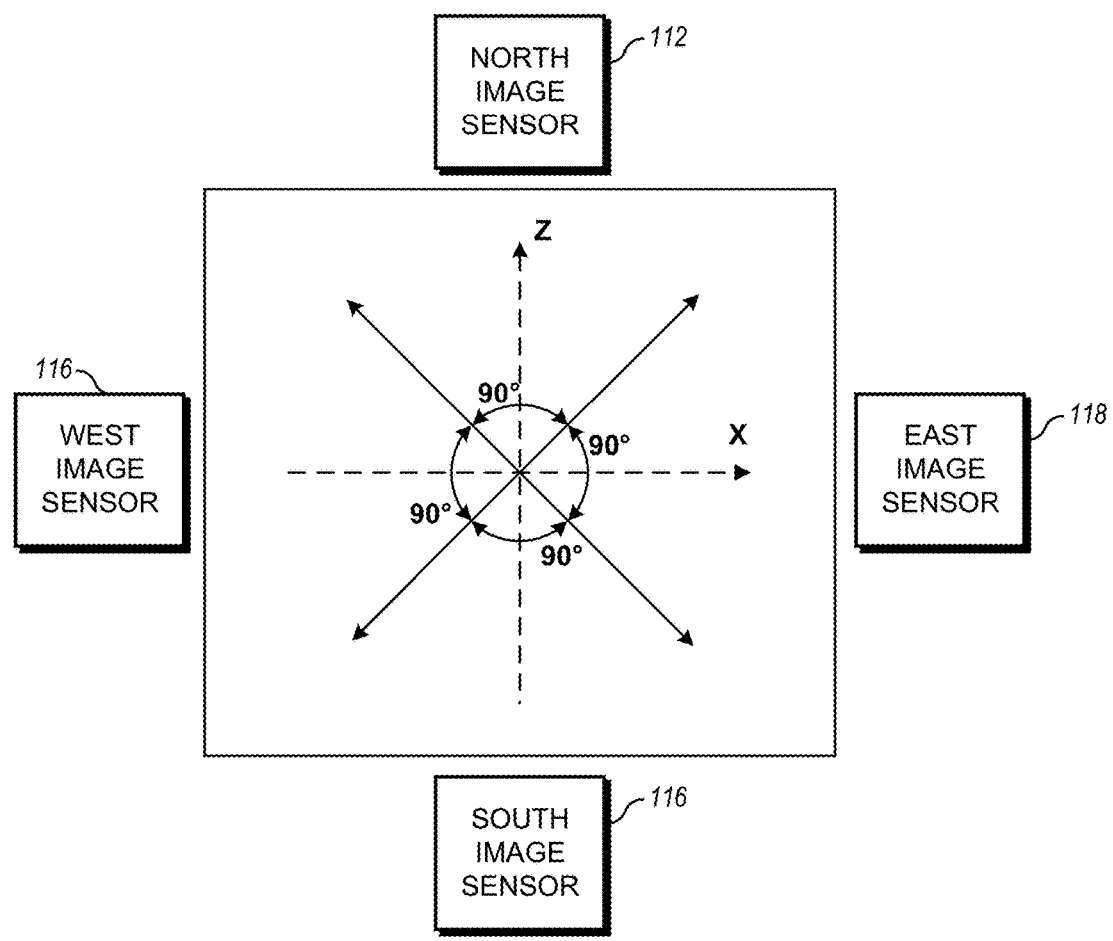
FIG. 4 is diagram representative of a directional scheme implemented by the example reference setter of FIG. 3.

The example direction identifier 308 of FIG. 3 utilizes the data generated by the 3D mapper 306 to determine or at least estimate a direction of movement of the matching features and, thus, a direction of movement of the vehicle 122 corresponding to the matching features. In particular, the example direction identifier 308 of FIG. 3 defines two possible directions of movement (i.e., toward and away) for each of the image sensors 112-118. Referring to the example loading dock of FIG. 1, the vehicle 122 can enter the imaging area 120 in the first direction 126 or the second direction 128. Accordingly, the example direction identifier 308 of FIG. 3 defines a first possible direction for the vehicle 122 as a Z+, a second possible direction as Z−, a third possible direction as X+, and a fourth possible direction as X−. FIG. 4 illustrates a relationship of the example Z directions and the example X directions used by the example direction identifier 308 of FIG. 3. In the illustrated example, the direction identifier 308 rotates the point cloud such that the Z-axis, which corresponds to the depth data captured by the image sensors 112-118, is parallel to the ground.

The example direction identifier 308 of FIG. 3 calculates a motion vector for each of the Z directions and the X directions for the matching feature pairs, as provided to the direction identifier 308 by the 3D mapper 306. In some examples, the direction identifier 308 only uses those of the matching features pairs that indicative movement. For each of the matching features pairs, the example direction identifier 308 of FIG. 3 generates a vote by determining a maximum magnitude and sign of the corresponding motion vector. That is, the example direction identifier 308 of FIG. 3 determines a likely direction of movement indicated by each of the matching feature pairs. The example direction identifier 308 of FIG. 3 determines which of the directions has the most votes and selects that direction for the corresponding series of frames. Put another way, the example direction identifier 308 of FIG. 3 selects the movement direction according to the following equations, wherein i represents a matching feature pair taken from consecutive frames at time t and t+1:

$$MovementDirection = \max(\text{Vote}(Z_{+(-)}), \text{Vote}(X_{+(-)}));  \quad (1)$$

$$\text{Vote}(Z_{+(-)}) = \sum_{i=1}^{N} \text{Vote}(Z_{+(-),i});  \quad (2)$$

$$\text{Vote}(X_{+(-)}) = \sum_{i=1}^{N} \text{Vote}(X_{+(-),i});  \quad (3)$$

$$\text{Vote}(Z_{+,i}) = \left\{ \frac{1, \text{if} |Z_{i,t+1} - Z_{i,t}| \geq |X_{i,t+1} - X_{i,t}| \,\&\&\, (Z_{i,t+1} - Z_{i,t}) > 0}{0, \text{else}} \right\};  \quad (4)$$

$$\text{Vote}(Z_{-,i}) = \left\{ \frac{1, \text{if} |Z_{i,t+1} - Z_{i,t}| \geq |X_{i,t+1} - X_{i,t}| \,\&\&\, (Z_{i,t+1} - Z_{i,t}) < 0}{0, \text{else}} \right\};  \quad (5)$$

$$\text{Vote}(Z_{+,i}) = \left\{ \frac{1, \text{if} |Z_{i,t+1} - Z_{i,t}| < |X_{i,t+1} - X_{i,t}| \,\&\&\, (X_{i,t+1} - X_{i,t}) > 0}{0, \text{else}} \right\};  \quad (6)$$

$$\text{Vote}(Z_{-,i}) = \left\{ \frac{1, \text{if} |Z_{i,t+1} - Z_{i,t}| < |X_{i,t+1} - X_{i,t}| \,\&\&\, (X_{i,t+1} - X_{i,t}) < 0}{0, \text{else}} \right\};  \quad (7)$$

The determined direction of movement is provided to the example sensor selector 310 of FIG. 3. The example sensor selector 310 of FIG. 3 selects one of the image sensors 112-118 as the reference sensor based on the determined direction of movement. As indicated in FIG. 4, the example sensor selector 310 selects the north image sensor 112 as the reference sensor if the direction identifier 308 identifies the Z+ direction, the west image sensor 114 if the direction identifier 308 identifies the X− direction, the south image sensor 116 if the direction identifier 308 identifies the Z− direction, or the east image sensor 118 if the direction identifier 308 identifies the X+ direction.

The example sensor selection 310 of FIG. 3 provides the reference sensor selection to a 3D data transformer 312 of the reference setter 200. Additionally, the example 3D data transformer 312 receives the depth data, as filtered by an outlier remover 314 and a background remover 316, generated by the image sensors 112-118. In particular, the example outlier remover 314 of FIG. 3 removes points in a point cloud that exceed a threshold value (e.g., depth) associated with the imaging area 120. Moreover, the example background remover 316 of FIG. 3 removes points in the point cloud known (e.g., according to background images obtained of the imaging area 120 previous to the vehicle 122 entering the imaging area 120) to correspond to background elements (e.g., fixed structures of the loading dock such as the frame 110 and/or a sign posted on a wall). The example 3D transformer 312 of FIG. 3 transforms or maps the image data from the non-reference image sensors to the coordinate system of the reference sensor. To continue the example scenario of FIG. 1, the 3D transformer 312 is informed that the west image sensor 114 is selected as the reference sensors and, thus, transforms image data generated by the north, south, and east image sensors 112, 116, and 118 to the coordinate system of the west image sensor 114. In the illustrated example of FIG. 3, the 3D transformer 312 utilizes a calibration matrix 318 associated with the image sensors 112-118 to perform the transformation. The example calibration matrix 318 of FIG. 3 includes values that represent spatial relationships between pairs of the image sensors 112-118. To transform data points generated by a first one of the image sensors 112-118 to a coordinate system of a second one of the image sensors 112-118, the example 3D transformer 312 of FIG. 3 performs an operation (e.g., a multiplication) on the data points generated by the first one of the images sensors 112-118 using values of the calibration matrix 318 associated with the spatial relationship between the first and second ones of the image sensors 112-118.

Accordingly, the example reference setter 200 of FIG. 3 generates a 3D point cloud representative of the imaging area 120 (and the vehicle 122 present in the imaging area 120) from the different perspectives of the different image sensors 112-118.

Figure 5:
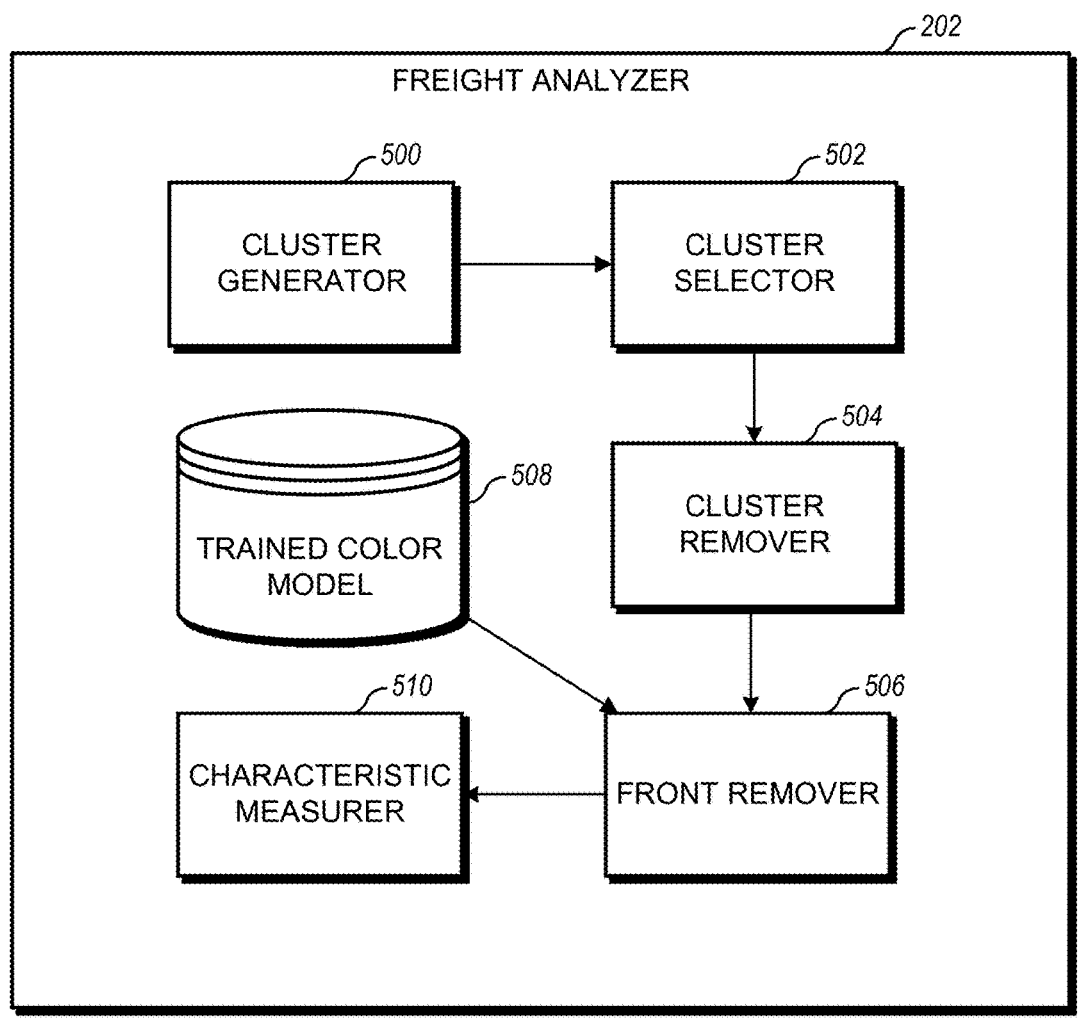
FIG. 5 is a block diagram representative of an example implementation of the freight analyzer of FIG. 2.

FIG. 5 is a block diagram representative of an example implementation of the freight analyzer 202 of FIG. 2. The example freight analyzer includes a cluster generator 500, a cluster selector 502, a cluster remover 504, a front remover 506, a trained color model 508, and a characteristic measurer 510. As described above, the example freight analyzer 202 is provided with an identifier indicative of which of the image sensors 112-118 is the current reference sensor and a point cloud including color data and depth data from the image sensors 112-118 that has been transformed to the coordinate system of the reference sensor.

The example cluster generator 500 combines points of the received point cloud that likely correspond to a common object into clusters. In the illustrated example of FIG. 5, the cluster generator 500 executes a Euclidean Cluster Extraction algorithm to generate the clusters. As such, the example cluster generator 500 of FIG. 5 generates a cluster for the object 124 and any other objects in the point cloud. The example cluster generator 500 provides the clusters and the associated data to the cluster selector 502. The example cluster selector 502 of FIG. 5 uses the reference sensor ID and depth data and/or coordinates associated with the clusters, which are in terms of the reference coordinate system, to identify one of the clusters as having a centroid nearest to the reference sensor. To continue the example scenario of FIG. 1, the example cluster selector 502 determines that the cluster corresponding to the object 124 has a centroid nearest to the west image sensor 114 as the vehicle 122 carrying the object 124 is moving toward the west image sensor 114. Accordingly, the cluster selector 502 identifies the points of the point cloud corresponding to the object 124. In the example of FIG. 5, the cluster remover 504 deletes points in the point cloud not corresponding to the cluster identified as corresponding to the object 124. That is, clusters other than the cluster identified as corresponding to the object 124 are removed by the example cluster remover 504. For example, the clusters corresponding to portions of the vehicle 122 are removed by the cluster remover 504. In some examples, the cluster remover 504 additionally removes unclustered points.

In the example of FIG. 5, the front remover 506 uses the trained color model 508 to identify one or more front structures of the vehicle 122 that remain in the point cloud after the cluster remover 504 has performed the deletions described above. Data points corresponding to, for example, a front structure of the vehicle may remain due to the cluster generator 500 mistakenly grouping data points corresponding to the vehicle with data points corresponding to the object 124. Such mistakes may result from the object 124 being close too and/or in contact with the vehicle 122. The trained color model 508 includes color value(s) known to correspond to a front structure of the vehicle 122. For example, when the vehicle 122 is a particular type of forklift, the carrying assembly (e.g., forks and rails along which the forks move up and down) is known to be black. The example front remover 506 of FIG. 5 searches the point cloud for the color values known to correspond to the particular type of the vehicle 122. The example front remover 506 deletes any identified points in the point cloud corresponding to the front structure(s) of the vehicle 122. Notably, this removal rids the point cloud of image data corresponding to structure that is in contact with the object 124 which, without the example freight analyzer 202, is difficult to distinguish from the object 124 for purposes of, for example, dimensioning the object 124.

The example front remover 506 of FIG. 5 provides the point cloud, with the points not corresponding to the object 124 removed The point cloud, with the points not corresponding to the object 124 removed, is provided to the characteristic measurer 510. The example characteristic measurer 510 of FIG. 5 calculates any desired characteristic of the object 124 such as, for example, one or more dimensions of the object 124. The characteristics are provided to, for example, the freight characteristic database 204 and/or are communicated to a requestor.

Figure 6:
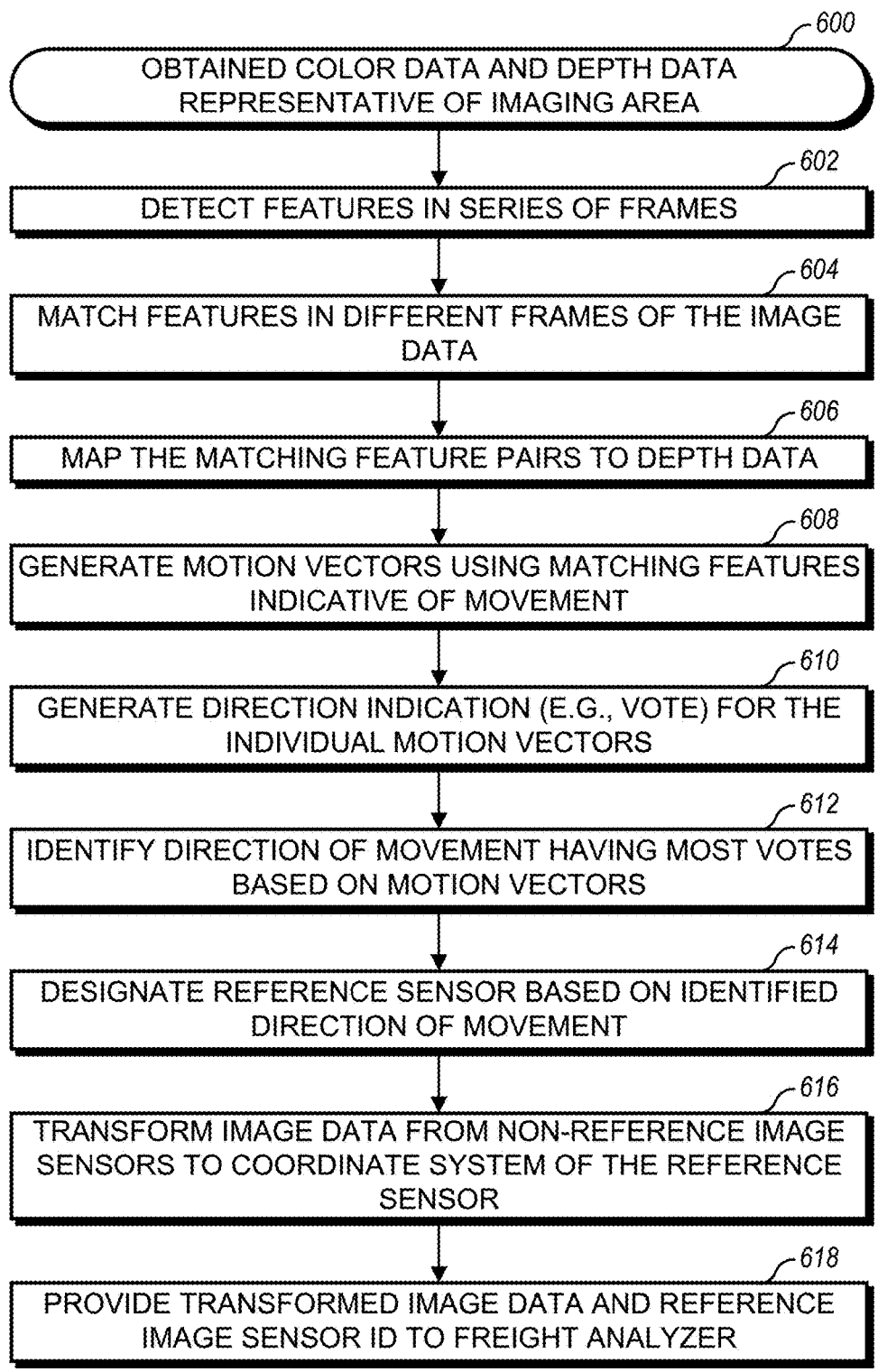
FIG. 6 is flowchart representative of example operations that may be executed to implement the example reference setter of FIGS. 2 and/or 3.

FIG. 6 is a flowchart representative of example operations capable of implementing the example reference setter 200 of FIGS. 2 and/or 4. As described above in connection with FIG. 1, the image sensors 112-118 of the dimensioning system 100 generate color data and depth data representative of the imaging area 120 from different perspectives. In the example of FIG. 6, the reference setter 200 obtains or is otherwise provided with the color data and the depth data (block 600). The example feature detector 302 (FIG. 3) identifies a plurality of features (e.g., known identifiable structures, text, or images and/or other aspects of the image data that can be repeatedly and distinguishably identified) present in the imaging area 120 by analyzing at least two frames of the obtained color data (block 602). The example feature matcher 304 (FIG. 3) determines whether any of the features appears in multiple frames and, if so, identifies the common features as matching features across the frames (block 604). The example 3D mapper 306 (FIG. 3) maps the matching features to the obtained depth data (block 606).

The example direction identifier 308 (FIG. 3) generates motion vectors that represent motion of the matching features (block 608). The example direction identifier 308 generates a direction indication for the individual motion vectors (block 610). That is, each of the motion vectors is indicative of movement in a particular direction (e.g., toward the west image sensors 114 of FIG. 1) and the direction identifier 308 determines which that direction for the individual motion vectors. Put another way, each of the motion vectors casts a vote for the movement direction of the vehicle 122. In the example of FIG. 6, the example direction identifier 308 only generates a vote for those of the matching features that are indicative of movement (e.g., by exceeding a threshold difference between coordinate locations). That is, votes of motion vectors not exceeding the threshold difference between the matching features are discarded. The example direction identifier 308 of FIG. 3 determines which of the directions has the most votes and selects that direction for the corresponding series of frames (block 612). For example, the direction identifier 308 uses example equations (1)-(7) above to generate the votes and to determine which direction is to be selected.

The example sensor selector 310 (FIG. 3) uses the determined direction of movement of the vehicle 122 to designate one of the image sensors 112-118 as the reference sensor based on the determined direction of movement (block 614). For example, the sensor selector 310 selects the west image sensor 114 if the direction identifier 308 identifies the X-direction in the example system of FIG. 4.

With the knowledge of the image sensor 112-118 toward which the vehicle 122 is moving, the example 3D data transformer 312 of the reference setter 200 transforms the color data and depth data of the non-reference image sensors 112-118 to the coordinate system of the reference sensor (block 616). In the illustrated example of FIG. 6, the 3D data transformer 312 receives image data filtered by the outlier remover 314, which removes outlying points in the point cloud corresponding to points not of interest, and by the background remover 316, which removes points in the point cloud known to correspond to background associated with the loading dock. In the illustrated example of FIG. 3, the 3D transformer 312 utilizes the calibration matrix 318 associated with the image sensors 112-118 to perform the transformation. In the example of FIG. 65, the 3D data transformer 312 provides the transformed image data and the reference sensor ID to the freight analyzer 202.

Figure 7:
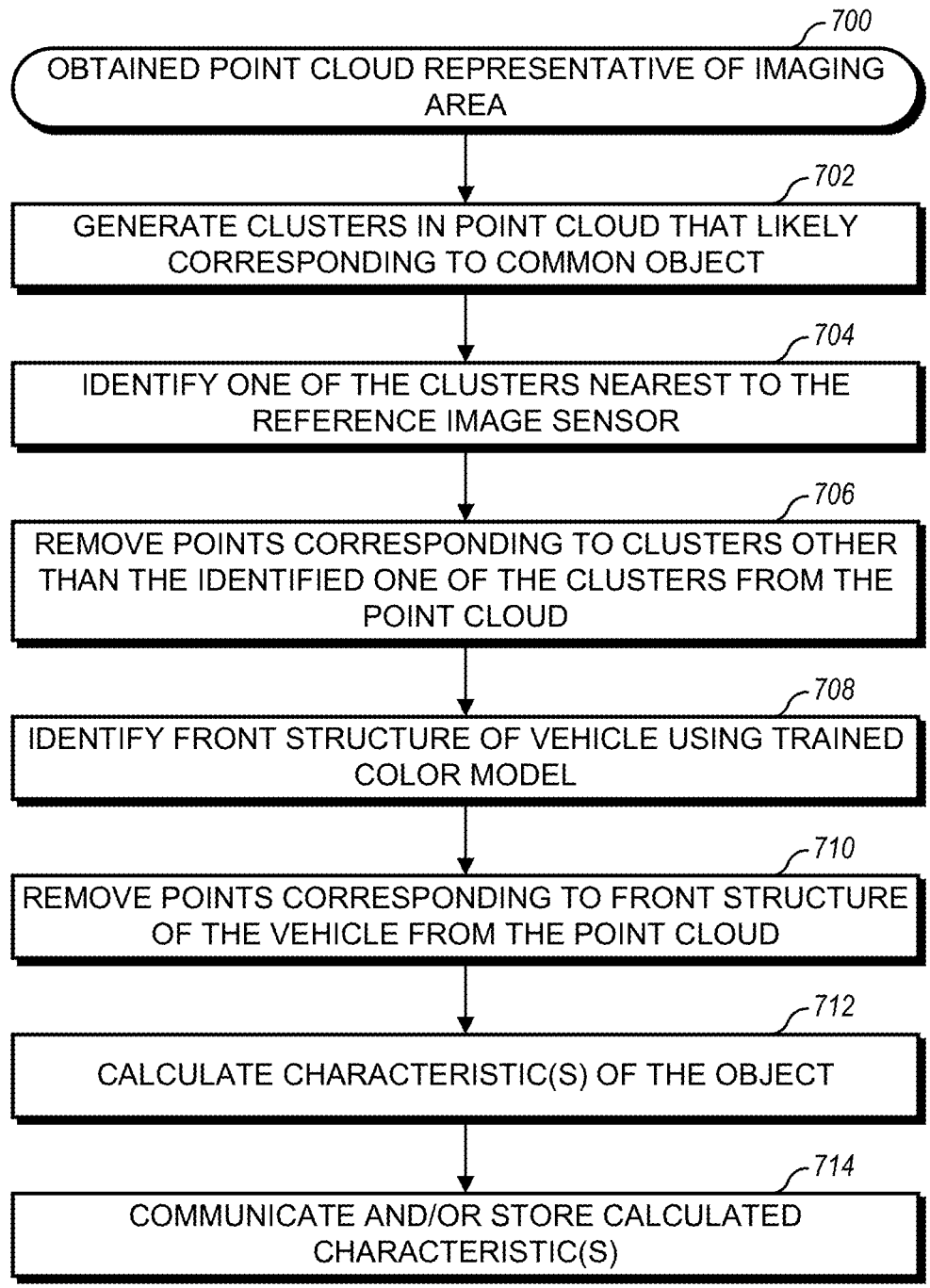
FIG. 7 is a flowchart representative of example operations that may be executed to implement the example freight analyzer of FIGS. 2 and/or 5.

FIG. 7 is a flowchart representative of example operations that can be executed to implement, for example, the freight analyzer 202 of FIGS. 2 and/or 5. In the example of FIG. 7, the freight analyzer 202 obtains or is otherwise provided with the point cloud generated by, for example, the reference setter 200 (block 700). In the example of FIG. 7, the cluster generator 500 (FIG. 5) combines points likely to correspond to a common object into clusters (block 702). That is, the example cluster generator 500 identifies points in the point cloud that likely correspond to a same object and groups those points together to form a cluster using, for example, a Euclidean Cluster Extraction technique or algorithm. In the example of FIG. 7, the example cluster selector 502 (FIG. 5) uses the reference sensor ID and depth data and/or coordinates associated with the clusters, which are in terms of the reference coordinate system, to identify one of the clusters as having a centroid nearest to the reference sensor (block 704). Such a cluster corresponds to the object 124. The example cluster remover 504 deletes points in the point cloud not corresponding to the cluster identified as corresponding to the object 124 (block 706). For example, the points belonging to clusters corresponding to the vehicle 122 are removed by the cluster remover 504.

The example front remover 506 (FIG. 5) utilizes the trained color model 508 to identify remaining (e.g., after the deletions performed by the cluster remover 504) points in the point cloud that correspond to one or more front structures of the vehicle 122 (block 708). For example, the front remover 506 searches the point cloud for color values known in the trained color model 508 to correspond to the front structure(s) of the vehicle 122. The example front remover 506 (FIG. 5) deletes any identified points in the point cloud corresponding to the front structure(s) of the vehicle 122 (block 710). Notably, this removal rids the point cloud of image data corresponding to structure that is in contact with the object 124 which, without the example freight analyzer 202, is difficult to distinguish from the object 124 for purposes of, for example, dimensioning the object 124.

In the example of FIG. 7, the characteristic measurer 510 (FIG. 5) calculates any desired characteristic of the object 124 such as, for example, one or more dimensions of the object 124 (block 712). The characteristics are communicated or stored in, for example, the characteristic database 204 (FIG. 2) (block 714).

Referring back to FIG. 1, to improve accuracy of the calibration or alignment of the different image sensors 112-118 with each other, the example dimensioning system 100 includes an image sensor calibrator 134 constructed in accordance with teachings of this disclosure. In some instances, the image sensors 112-118 are required to cover a large area and, thus, are spaced apart by significant distance(s). For example, the north image sensor 112 may be spaced apart from the west image sensor 114 such that only a few points of overlap are present between a first field of view of the north image sensor 112 (i.e., the north field of view) and a second field view of the west image sensor 114 (i.e., the west field of view). Typically, calibration techniques suffer (e.g., in terms of accuracy and/or speed) from insufficient points of overlap between the different fields of view.

The example image sensor calibrator 134 of FIG. 1 improves accuracy and speed of the calibration process that is tasked with aligning, for example, the image sensors 112-118 of FIG. 1. In some examples, the image sensor calibrator 134 generates data for the calibration matrix 318 of FIG. 3, which is used to, for example, transform image data from the non-reference images sensors 112-118 to the reference images sensor 112-118. In the illustrated example of FIG. 1, the image sensor calibrator 134 is implemented on the processing platform 132 deployed at the loading dock. However, the example image sensor calibrator 134 disclosed herein may be implemented in any suitable processing platform such as, for example, a processing platform deployed on the vehicle 122 and/or a mobile processing platform carried by a person associated with the vehicle 122 or, more generally, the loading dock. An example implementation of the processing platform 132 described below in connection with the FIG. 11.

As described in detail below, the example image sensor calibrator 134 of FIG. 1 executes first and second calibration stages to generate an accurate calibration matrix, which may be referred to as a transformation matrix. The first calibration stage implemented by the image sensor calibrator 134 of FIG. 1 is based on 2D image data. In some examples, the 2D image data includes RGB values at the coordinates. Alternatively, the 2D image data may include grayscale values at the coordinates. The first calibration stage implemented by the example image sensor calibrator 134 may be referred to herein as an initial calibration that generates an initial transformation matrix, as the first calibration stage generates a coarse or rough transformation matrix. The second calibration stage implemented by the image sensor calibrator 134 of FIG. 1 is based on 3D image data including depth information. The second calibration stage implemented by the example image sensor calibrator 134 may be referred to herein as a refinement calibration, as the second calibration stage refines the initial transformation matrix to more accurately reflect the spatial relationship between the image sensors 112-118.

Figure 8:
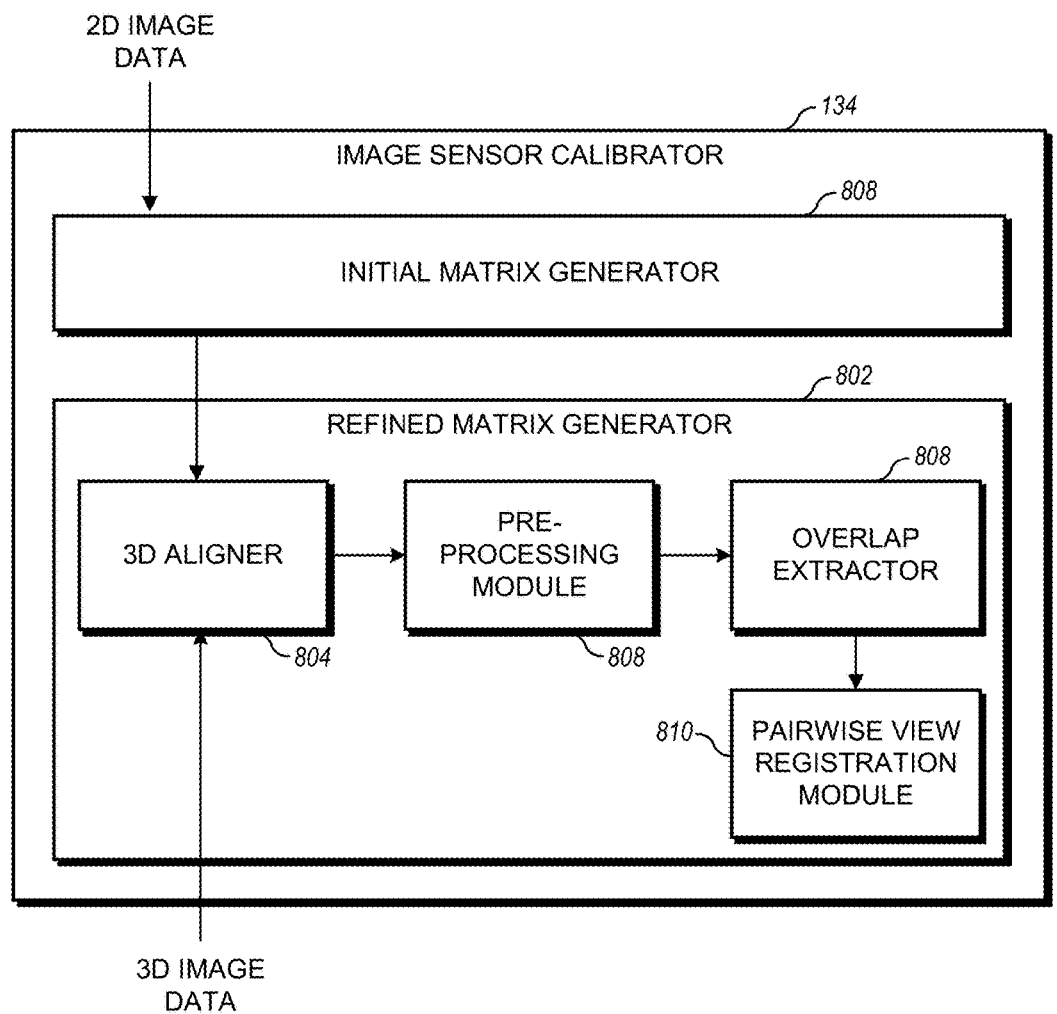
FIG. 8 is a block diagram representative of an example implementation of the image sensor calibrator of FIG. 1.

FIG. 8 is a block diagram representative of an example implementation of the image sensor calibrator 134 of FIG. 1. FIGS. 9A-9F are described below in conjunction with FIG. 8 for purposes of illustration. That is, the example elements of FIGS. 9A-9F are for purposes of illustration and not limitation, as the example image sensor calibrator 134 can be applied or implemented in additional or alternative environments than the environment shown in FIGS. 9A-9F.

The example sensors calibrator 134 of FIG. 8 includes an initial matrix generator 800 to generate an initial transformation matrix based on 2D image data (e.g., grayscale values or RGB values) provided by the image sensors 112-118. In the illustrated example of FIG. 8, the initial matrix generator 800 generates the initial transformation matrix based on a calibration structure or element deliberately placed in the imaging area 120 for purposes of the calibrating the image sensors 112-118. FIG. 9A illustrating a first frame 900 of 2D image data generated by, for example, the east image sensor 118 of FIG. 1. In the example first frame 900 of FIG. 9A, a calibration tool 902 has been placed in the imaging area 120. The example calibration tool 902 of FIG. 9A is a board having a checkboard pattern. FIG. 9B illustrates a second frame 904 of 2D image data generated by, for example, the west image sensor 114 of FIG. 1. In the example second frame 904 of FIG. 9B, the calibration tool 902 is shown from a different perspective than the perspective from the east image sensor 118. In some examples, the initial matrix generator 800 uses the first and second frames 900 and 904 and additional frames of 2D image data from the other (north and south) image sensors 112 and 116 to generate the initial transformation matrix. In particular, the checkboard pattern of the calibration tool 902 provides the initial transformation matrix with data points (e.g., straight lines and corners) that can be matched between the different image sensors 112-118. The example initial matrix generator 800 generates mapping values for the initial transformation matrix based on the data points provided by the calibration tool 902.

In some instances, the initial transformation matrix generated by the initial matrix generator 800 includes alignment errors. The example image sensor calibrator 134 of FIG. 8 includes a refined matrix generator 802 that uses 3D image data to refine the initial transformation matrix into a refined transformation matrix. In the example of FIG. 8, the refined matrix generator 802 includes a 3D aligner to align 3D image data generated by the different image sensors 112-118 based on the initial transformation matrix. That is, the example 3D aligner 804 of FIG. 8 uses the initial transformation matrix to align depth values generated by one of the image sensors 112-118 to the depth values generated by one or more other ones of the image sensors 112-118. Accordingly, the example 3D aligner 804 of FIG. 8 applies the initial transformation matrix to the 3D image data. FIG. 9C illustrates how the application of the initial transformation matrix may result in alignment errors in the depth data. The alignment errors illustrated in FIG. 9C are caused by in accuracies in the initial transformation matrix.

The example image sensor calibrator 134 of FIG. 8 includes a pre-processing module 806 to condition the transformed depth values for further processing. For example, the pre-processing module 806 removes points in the depth point cloud that correspond to a floor of the imaging area 120. FIG. 9D illustrates the point cloud of FIG. 9C with points corresponding to the floor having been removed by the example pre-processing module 806 of FIG. 8. Additional or alternative pre-processing operations may be performed.

The example image sensor calibrator 134 of FIG. 8 includes an overlap extractor 808 to execute a nearest neighbor search of the point cloud to identify overlapping points in the point cloud. The example overlap extractor 808 of FIG. 8 extracts the identified overlapping points in the point cloud and discards non-overlapping points. FIG. 9E illustrates the overlapping points extracted by the example overlap extractor 808 of FIG. 8. When alignment errors are present, an offset is present between identified overlapping points.

The example image sensor calibrator 134 of FIG. 8 includes a pairwise view registration module 810 to refine the initial transformation matrix based on the overlapping points identified by the example overlap extractor 808 and the offsets between the overlapping points. In particular, the example pairwise view registration module 810 generates a translation factor (e.g., a multiplier) that compensates for the offsets between respective overlapping points. As such, to achieve proper alignment, an operation (e.g., multiplication or dot product) can be executed on values of the initial transformation matrix using the values generated by the pairwise view registration module 810. In the illustrated example, the refined transformation matrix corresponds to a combination of the initial transformation matrix and the values generated by the pairwise view registration module 810 of FIG. 8. FIG. 9F illustrates the improved alignment of the depth values according to the refined transformation matrix generated by the example pairwise view registration module 810.

Figure 10:
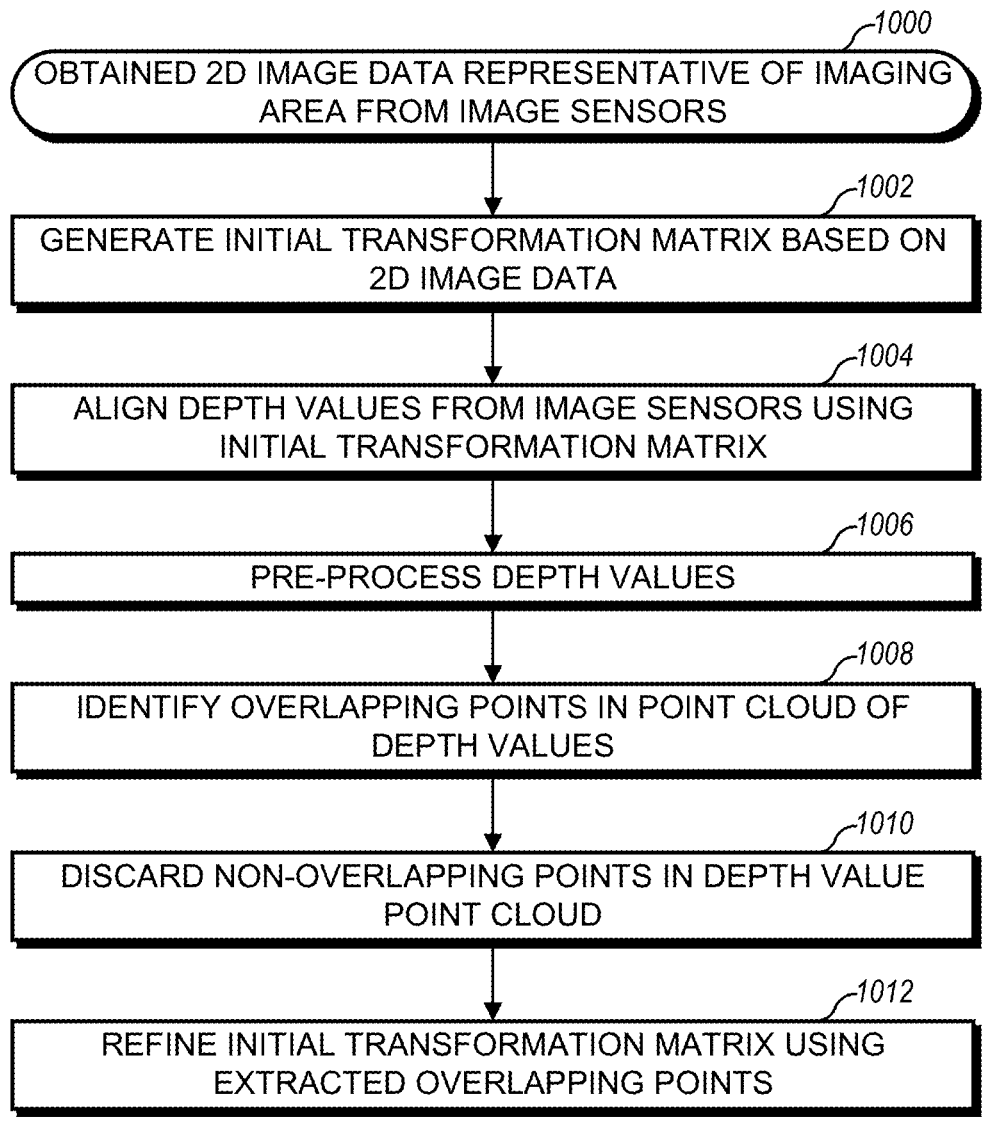
FIG. 10 is a flowchart representative of example operations that may be executed to implement the example image sensor calibrator of FIGS. 1 and/or 8

FIG. 10 is a flowchart representative of example operations that capable of implementing the example image sensor calibrator 134 of FIGS. 1 and/or 8. In the example of FIG. 10, the image sensor calibrator 134 obtains 2D image data representative of the imaging area 120 from, for example, two of the image sensors 112-118 (block 1000). For example, the image sensor calibrator 134 obtains 2D image data generated by the west and east image sensors 114 and 118. The example initial matrix generator 800 generates an initial transformation matrix based on the obtained 2D image data (block 1002) which, in the illustrated example, includes an extrinsic calibration tool (e.g., the calibration tool 902 of FIG. 9).

In the example of FIG. 10, the 3D aligner 804 (FIG. 8) aligns the depth values from the two of the image sensors 112-118 using the initial transformation matrix (block 1004). In the example of FIG. 10, the pre-processing module 806 (FIG. 8) conditions the depth values from the two image sensors 112-118 by, for example, removing points corresponding to a floor of the imaging area 120 (block 1006).

To correct or improve upon alignment errors resulting from inaccuracies of the initial transformation matrix, the example overlap extractor 808 that executes a nearest neighbor search of the point cloud to identify overlapping points in the point cloud (block 1008). The example overlap extractor 808 extracts the overlapping points and discards the non-overlapping points of the point cloud (block 1010).

In the example of FIG. 10, the pairwise view registration module 810 refines the initial transformation matrix based on the overlapping points identified by the example overlap extractor 808. In particular, the pairwise view registration module 810 generates the refined transformation matrix based on offsets between the extracted overlapping points. In some examples, the refined transformation matrix is stored as the example calibration matrix 318 of FIG. 3.

Figure 11:
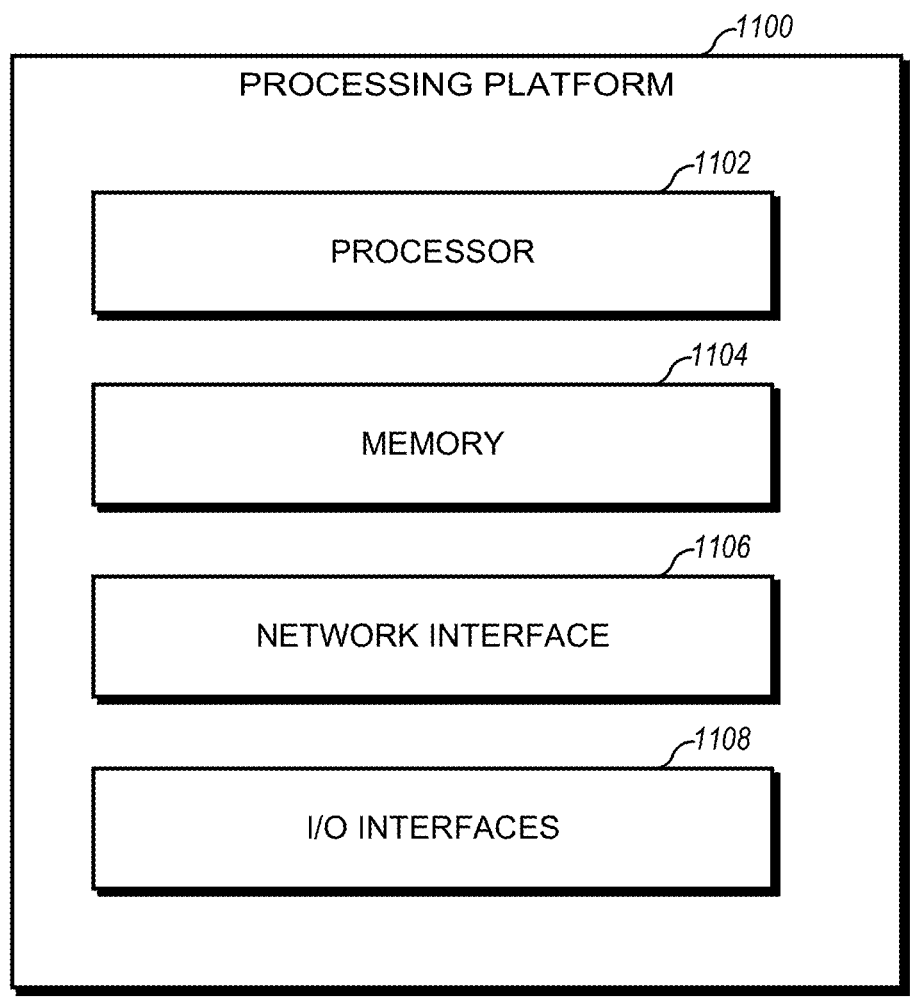
FIG. 11 is a block diagram of an example logic circuit capable of executing the example operations of FIG. 6 to implement the example reference setter of FIGS. 2 and/or 3, the example operations of FIG. 7 to implement the example freight analyzer of FIGS. 2 and/or 5, and/or the example operations of FIG. 10 to implement the example image sensor calibrator of FIGS. 1 and/or 8.

FIG. 11 is a block diagram representative of an example logic circuit that may be utilized to implement, for example, the example reference setter 200 of FIGS. 2 and/or 3, the example freight analyzer 202 of FIGS. 2 and/or 5, and/or, more generally, the example freight dimensioner 130 of FIGS. 1 and/or 2. Additionally or alternatively, the example logic circuit represented in FIG. 11 may be utilized to implement the example initial matrix generator 800 of FIG. 8, the refined matrix generator 802 of FIG. 8, and/or, more generally, the example image sensor calibrator 134 of FIGS. 1 and/or 8. The example logic circuit of FIG. 11 is a processing platform 1100 capable of executing instructions to, for example, implement the example operations represented by the flowcharts of the drawings accompanying this description. As described below, alternative example logic circuits include hardware (e.g., a gate array) specifically configured for performing operations represented by the flowcharts of the drawings accompanying this description.

The example processing platform 1100 of FIG. 11 includes a processor 1102 such as, for example, one or more microprocessors, controllers, and/or any suitable type of processor. The example processing platform 1100 of FIG. 11 includes memory (e.g., volatile memory, non-volatile memory) 1104 accessible by the processor 1102 (e.g., via a memory controller). The example processor 1102 interacts with the memory 1104 to obtain, for example, machine-readable instructions stored in the memory 1104 corresponding to, for example, the operations represented by the flowcharts of this disclosure. Additionally or alternatively, machine-readable instructions corresponding to the example operations of the flowcharts may be stored on one or more removable media (e.g., a compact disc, a digital versatile disc, removable flash memory, etc.) that may be coupled to the processing platform 1100 to provide access to the machine-readable instructions stored thereon.

The example processing platform 1100 of FIG. 11 includes a network interface 1106 to enable communication with other machines via, for example, one or more networks. The example network interface 1106 includes any suitable type of communication interface(s) (e.g., wired and/or wireless interfaces) configured to operate in accordance with any suitable protocol(s).

The example processing platform 1100 of FIG. 11 includes input/output (I/O) interfaces 1108 to enable receipt of user input and communication of output data to the user.

The above description refers to block diagrams of the accompanying drawings. Alternative implementations of the examples represented by the block diagrams include one or more additional or alternative elements, processes and/or devices. Additionally or alternatively, one or more of the example blocks of the diagrams may be combined, divided, re-arranged or omitted. Components represented by the blocks of the diagrams are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations represented by the flowcharts of this disclosure). Some example logic circuits are hardware that executes machine-readable instructions to perform operations (e.g., one or more of the operations represented by the flowcharts of this disclosure). Some example logic circuits include a combination of specifically configured hardware and hardware that executes machine-readable instructions.

The above description refers to flowcharts of the accompanying drawings. The flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations represented by the flowcharts are implemented by machine-readable instructions (e.g., software and/or firmware) stored on a medium (e.g., a tangible machine-readable medium) for execution by one or more logic circuits (e.g., processor(s)). In some examples, the operations represented by the flowcharts are implemented by one or more configurations of one or more specifically designed logic circuits (e.g., ASIC(s)). In some examples the operations of the flowcharts are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) can be stored. Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

As used herein, each of the terms "tangible machine-readable medium," "non-transitory machine-readable medium" and "machine-readable storage device" is expressly defined as a storage medium on which machine-readable instructions are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. A method comprising:
   determining, using a logic circuit, a first sensor of a plurality of sensors toward which a vehicle is moving based on image data generating by the plurality of sensors, the image data representative of the vehicle and an object carried by the vehicle;
   designating the first sensor as a reference sensor;
   combining, using the logic circuit, the image data from the plurality of sensors to generate combined image data representative of the vehicle and the object carried by the vehicle, the combining based on the reference sensor;
   generating, using the logic circuit, a plurality of clusters based on the combined image data; and
   identifying, using the logic circuit, a first one of the clusters nearest the reference sensor as the object.

2. A method as defined in claim 1, further comprising segmenting the first one of the clusters from a second one of the clusters by removing the second one of the clusters from the combined image data.

3. A method as defined in claim 2, further comprising dimensioning the first one of the clusters.

4. A method as defined in claim 1, further comprising:
   identifying a first structure of the vehicle nearer to the reference sensor than other structures of the vehicle; and
   removing points in the combined image data corresponding to the first structure of the vehicle.

5. A method as defined in claim 4, wherein:
   identifying the first structure of the vehicle comprises determining a color of a front assembly of the vehicle; and
   removing the points in the combined image data corresponding to the first structure of the vehicle comprises determining that the points have the determined color of the front assembly of the vehicle.

6. A method as defined in claim 5, wherein:
   the vehicle is a forklift; and
   the front assembly of the forklift is a carrying portion of the forklift on which the object is carried.

7. A method as defined in claim 1, wherein combining the image data to generate the combined image data comprises transforming the image data into a coordinate system of the reference sensor.

8. A tangible machine-readable medium comprising instructions that, when executed, cause a machine to at least:
   determine a first sensor of a plurality of sensors toward which a vehicle is moving based on image data generating by the plurality of sensors, the image data representative of the vehicle and an object carried by the vehicle;
   designate the first sensor as a reference sensor;
   combine the image data from the plurality of sensors to generate combined image data representative of the vehicle and the object carried by the vehicle, the combining based on the reference sensor;
   generate a plurality of clusters based on the combined image data; and
   identify a first one of the clusters nearest the reference sensor as the object.

9. A tangible machine-readable medium as defined in claim 8, wherein the instructions, when executed, cause the machine to segment the first one of the clusters from a second one of the clusters by removing the second one of the clusters from the combined image data.

10. A tangible machine-readable medium as defined in claim 9, wherein the instructions, when executed, cause the machine to dimension the first one of the clusters.

11. A tangible machine-readable medium as defined in claim 8, wherein the instructions, when executed, cause the machine to:
    identify a first structure of the vehicle nearer to the reference sensor than other structures of the vehicle; and
    remove points in the combined image data corresponding to the first structure of the vehicle.

12. A tangible machine-readable medium as defined in claim 11, wherein the instructions, when executed, cause the machine to:
    identify the first structure of the vehicle by determining a color of a front assembly of the vehicle; and
    remove the points in the combined image data corresponding to the first structure of the vehicle by determining that the points have the determined color of the front assembly of the vehicle.

13. A tangible machine-readable medium as defined in claim 12, wherein:
the vehicle is a forklift; and
the front assembly of the forklift is a carrying portion of the forklift on which the object is carried.

14. A tangible machine-readable medium as defined in claim 8, wherein the instructions, when executed, cause the machine to combine the image to generate the combined image data by transforming the image data into a coordinate system of the reference sensor.

15. An apparatus comprising:
a reference setter to:
  determine a first sensor of a plurality of sensors toward which a vehicle is moving based on image data generating by the plurality of sensors, the image data representative of the vehicle and an object carried by the vehicle;
  designate the first sensor as a reference sensor; and
  combine the image data from the plurality of sensors to generate combined image data representative of the vehicle and the object carried by the vehicle, the combining based on the reference sensor; and
a freight analyzer to:
  generate a plurality of clusters based on the combined image data; and
  identify a first one of the clusters nearest the reference sensor as the object, wherein at least one of the reference setter or the freight analyzer is implemented via a logic circuit.

16. An apparatus as defined in claim 15, wherein the freight analyzer is to segment the first one of the clusters from a second one of the clusters by removing the second one of the clusters from the combined image data.

17. An apparatus as defined in claim 16, wherein the freight analyzer is to dimension the first one of the clusters.

18. An apparatus as defined in claim 15, wherein the freight analyzer is to:
identify a first portion of the vehicle nearest to the reference sensor; and
remove points in the combined image data corresponding to the first portion of the vehicle.

19. An apparatus as defined in claim 18, wherein the freight analyzer is to:
identify the first portion of the vehicle by determining a color of a front assembly of the vehicle; and
remove the points in the combined image data corresponding to the first portion of the vehicle by determining that the points have the determined color of the front assembly of the vehicle.

20. An apparatus as defined in claim 19, wherein:
the vehicle is a forklift; and
the front assembly of the forklift is a carrying portion of the forklift on which the object is carried.

* * * * *